No. 864,009. PATENTED AUG. 20, 1907.
E. S. MARKS.
ADJUSTABLE HANDLE FOR BENCH PLANES.
APPLICATION FILED MAR. 7, 1907.
2 SHEETS—SHEET 1.
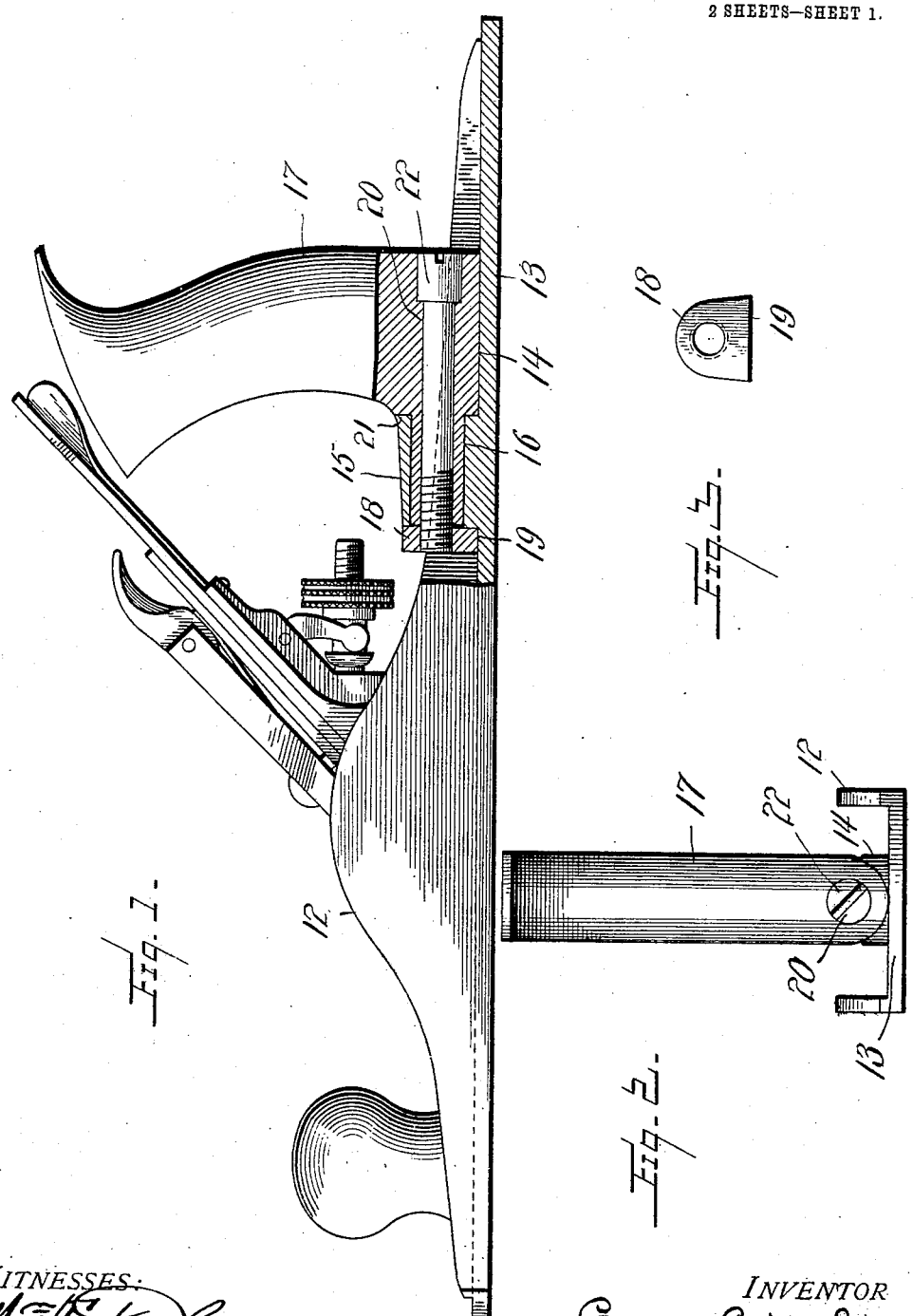
WITNESSES:
INVENTOR
Edward S. Marks,
BY
Attorneys

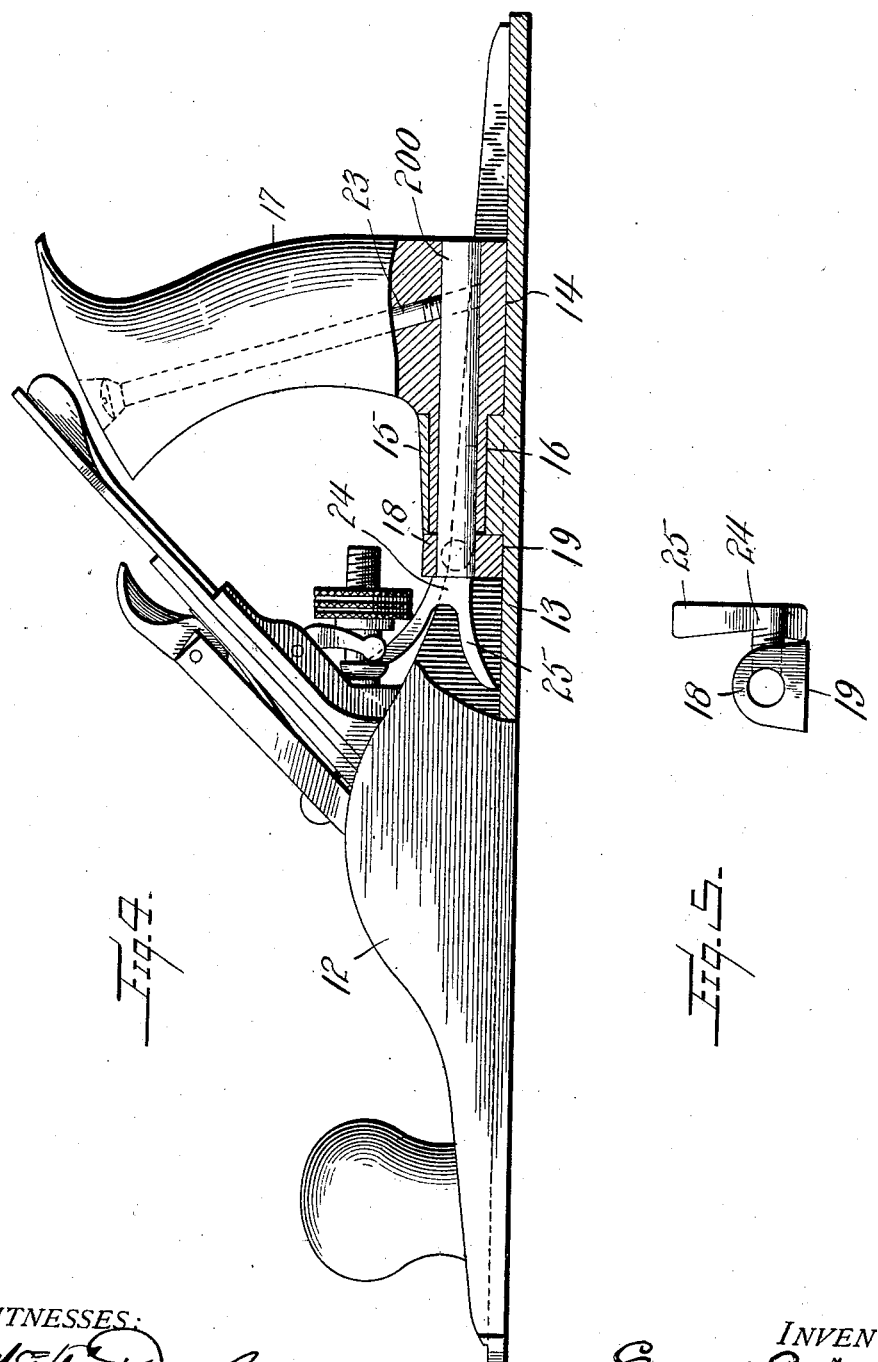

UNITED STATES PATENT OFFICE.

EDWARD S. MARKS, OF AUBURN, NEW YORK, ASSIGNOR TO OHIO TOOL COMPANY, OF AUBURN, NEW YORK, A CORPORATION OF NEW YORK.

ADJUSTABLE HANDLE FOR BENCH-PLANES.

No. 864,009.  Specification of Letters Patent.  Patented Aug. 20, 1907.

Application filed March 7, 1907. Serial No. 361,028.

*To all whom it may concern:*

Be it known that I, EDWARD S. MARKS, a citizen of the United States, residing at Auburn, in the county of Cayuga and State of New York, have invented or discovered certain new and useful Improvements in Adjustable Handles for Planes, of which the following is a specification, reference being had therein to the accompanying drawings.

My invention relates to improvements in adjustable handles for planes.

The object of my invention is to provide a reliable handle of the character specified which shall be simple in construction and which may be easily and quickly adjusted to any desired position.

To this end my invention comprises a preferably concave handle seat, a handle pivotally mounted on the body or stock of the plane and supported by said seat, and a device herein shown as a collar applied to the forwardly extending end of the handle and having a shoulder to bear against the sole of the plane, for locking the handle against tilting movement.

In the drawings accompanying and forming part of this specification, and illustrating a construction in which my invention may be embodied: Figure 1 is a vertical, longitudinal section of the handle portion of a plane constructed in accordance with my invention: Fig. 2 is a rear view of the same; Fig. 3 is an elevation of a collar hereinafter referred to; Fig. 4 is a view, similar to Fig. 1, of a modification. Fig. 5 is a view, similar to Fig. 3, of the collar used in the modification illustrated in Fig. 4.

Like reference characters indicate like parts throughout the several views of the drawings.

12 indicates the body or stock of the plane provided with the usual sole portion, 13. Upon the sole 13 is formed a concave handle seat 14, and an upstanding boss or lug 15 longitudinally bored to provide a bearing for a rounded, forwardly projecting portion 16 of the handle 17. The handle 17 is adapted to turn in its bearing in the boss 15, and to rock upon the seat 14 for the purposes of adjustment. Means are provided for locking the handle 17 in any desired position of adjustment, said means, as herein shown, comprising a collar 18, shown in detail in Figs. 3 and 5, having a shoulder or flattened portion 19 adapted to bear on the sole of the plane.

In the construction shown in Figs. 1 to 3, the collar 18 is formed as a nut adapted to engage the threaded end of a rod 20 passing through the handle 17, and the extension 16 thereof, and being provided at its rear end with a head 22, having means whereby said rod may be turned by means of a screw driver or other tool. The handle 17 is preferably provided with a shoulder 21, and when the rod 20 is turned to tighten the collar 18, the boss 15 will be clamped between the shoulder 21 and the collar 18, and the handle securely held against angular displacement, while the shoulder 19 on the collar 18 prevents rotation of the latter.

In the modification illustrated in Figs. 4 and 5 the collar 18 is provided with a smooth interior bore for the reception of an unthreaded rod 200, similar to the rod 20, but held against rotation in the handle 17 by a bolt 23. In this construction the collar 18 is tapped to receive a set screw 24, preferably provided with a finger piece 25. It will be obvious that when the set screw 24 is tightened upon the rod 200 the handle 17 will be securely held against turning or rocking movement, the shoulder 19, as heretofore stating, holding the collar 18 against rotation.

I do not limit myself to the precise constructions shown, it being obvious that many changes may be made in the details thereof without departing from the spirit or scope of my invention.

I claim:—

1. In a plane, the combination with a bearing, of a handle member having a projecting portion adapted to turn in said bearing, and clamping means engaging said projecting portion beyond said bearing.

2. In a plane, the combination with a bearing, of a handle member having a projecting portion rotatably mounted in said bearing, a collar detachably secured to said projecting portion beyond said bearing, and means for holding said collar against rotation.

3. In a plane, the combination with a sole and a bearing carried by said sole, of a handle member having a projecting portion rotatably mounted in said bearing, and a collar detachably secured to said projecting portion beyond said bearing, said collar having a shoulder engaging said sole.

4. In a plane, the combination with a sole provided with a bearing and a concave seat, of a handle member tiltingly mounted on said seat and having a projecting portion rotatably mounted in said bearing, and a collar detachably secured to said projecting portion beyond said bearing.

5. In a plane, the combination with a sole provided with a longitudinally bored boss, of a handle member seated upon said sole and having a projecting portion rotatably mounted in the bore of said boss, a rod extending longitudinally through said projecting portion, and a collar detachably secured to said rod beyond said boss.

6. In a plane, the combination with a bearing, of a handle member having a projecting portion rotatably mounted in said bearing, a collar mounted on said projecting portion beyond said bearing, and means for clamping said collar to said projecting portion.

7. In a plane, the combination with a bearing, of a handle member having a projecting portion rotatably mounted in said bearing, a rod extending longitudinally through said projecting portion, a collar mounted on said rod beyond said bearing, and a set screw in said collar engaging said rod.

8. In a plane, the combination with a bearing, of a handle member having a projecting portion rotatably mounted in said bearing, a rod extending longitudinally through said projecting portion, means for preventing rotation of said rod and said handle, a collar mounted on said rod beyond said bearing, and a set screw in said collar engaging said rod.

9. In a plane, the combination with a bearing, of a handle member, having a projecting portion rotatably mounted in said bearing, a rod extending longitudinally through said projecting portion, a collar mounted on said rod beyond said bearing, means for holding said collar against rotation, and a set screw in said collar engaging said rod.

In testimony whereof I affix my signature, in presence of two witnesses.

EDWARD S. MARKS.

Witnesses:
   JOHN W. BRAINARD,
   RALPH R. KEELER.